United States Patent
Yokonuma et al.

(10) Patent No.: US 9,898,969 B2
(45) Date of Patent: Feb. 20, 2018

(54) DRIVE CONTROL DEVICE, DISPLAY DEVICE INCLUDING THE SAME, AND DRIVE CONTROL METHOD

(71) Applicant: Sharp Kabushiki Kaisha, Osaka-shi, Osaka (JP)

(72) Inventors: Shinsuke Yokonuma, Osaka (JP); Hajime Washio, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 145 days.

(21) Appl. No.: 15/166,710

(22) Filed: May 27, 2016

(65) Prior Publication Data

US 2016/0275864 A1 Sep. 22, 2016

Related U.S. Application Data

(63) Continuation of application No. 14/373,647, filed as application No. PCT/JP2013/051270 on Jan. 23, 2013, now Pat. No. 9,378,694.

(30) Foreign Application Priority Data

Jan. 30, 2012 (JP) .................................. 2012-016149

(51) Int. Cl.
*G09G 3/30* (2006.01)
*G09G 3/3258* (2016.01)
*G09G 3/36* (2006.01)
*G06F 1/32* (2006.01)

(52) U.S. Cl.
CPC ........... *G09G 3/3258* (2013.01); *G06F 1/325* (2013.01); *G09G 3/3611* (2013.01); *G09G 3/3618* (2013.01); *G09G 3/3648* (2013.01); *G09G 3/3677* (2013.01); *G09G 2310/0251* (2013.01); *G09G 2310/08* (2013.01); *G09G 2330/021* (2013.01); *G09G 2330/022* (2013.01); *G09G 2370/08* (2013.01); *G09G 2370/10* (2013.01)

(58) Field of Classification Search
CPC ........................................... G09G 3/30–3/3291
See application file for complete search history.

(56) References Cited

U.S. PATENT DOCUMENTS

2003/0011626 A1* 1/2003 Tanabe ................. G09G 3/2022
345/690
2012/0062536 A1* 3/2012 Park ..................... G09G 3/3233
345/211

OTHER PUBLICATIONS

Yokonuma et al., "Drive Control Device, Display Device Including the Same, and Drive Control Method", U.S. Appl. No. 14/373,647, filed Jul. 22, 2014.

* cited by examiner

*Primary Examiner* — Sanghyuk Park
(74) *Attorney, Agent, or Firm* — Keating & Bennett, LLP

(57) ABSTRACT

Low frequency drive is performed that provides, after a charging period for refreshing a screen, a pause period for pausing the refresh. The length of the charging period is, for example, one frame and the length of the pause period is, for example, 59 frames. When new image data IMD is transmitted from a host to an LCD driver IC during the pause period, an interrupt process where the pause period is allowed to transition to the charging period is performed immediately thereafter. By performing the interrupt process, without waiting for the pause period with the predetermined length to end, the next charging period where refresh based on the new image data IMD is to be performed starts.

16 Claims, 11 Drawing Sheets

DRIVE CONTROL DEVICE, DISPLAY DEVICE INCLUDING THE SAME, AND DRIVE CONTROL METHOD

TECHNICAL FIELD

The present invention relates to a drive control device for a display device, and more particularly to a drive control device for a display device that performs low frequency drive, a display device including the drive control device, and a drive control method.

BACKGROUND ART

Conventionally, a reduction in power consumption is sought in display devices such as liquid crystal display devices. Hence, Japanese Patent Application Laid-Open No. 2001-312253 discloses a drive method for a display device, in which after a scanning period (also referred to as a charging period) T1 during which screen refresh is performed by scanning the gate lines of a liquid crystal display device, a pause period T2 during which the refresh is paused by placing all of the gate lines in a non-scanning state is provided. During the pause period T2, a gate driver is not provided with a clock signal and the like. Hence, since the overall drive frequency of the gate lines is reduced, a reduction in power consumption can be achieved. Drive that is performed by providing a pause period after a charging period, like the drive method described in Japanese Patent Application Laid-Open No. 2001-312253, is called, for example, "low frequency drive". Such low frequency drive is ideal for still image display.

Meanwhile, in recent years, a thin film transistor using an oxide semiconductor as a channel layer (hereinafter, referred to as an "oxide TFT") has been receiving attention. The oxide TFT has very low off-leakage current (which refers to a current flowing during an off state), compared to a thin film transistor using amorphous silicon, etc., as a channel layer (hereinafter, referred to as a "silicon-based TFT"). Hence, in a display device using oxide TFTs as elements in a display panel, voltages written into pixel capacitances can be held for a relatively long time. Therefore, the above-described low frequency drive is adopted particularly in a display device thus using oxide TFTs as elements in a display panel. Note, however, that low frequency drive may also be adopted in a display device using silicon-based TFTs as elements in a display panel.

PRIOR ART DOCUMENT

Patent Document

[Patent Document 1] Japanese Patent Application Laid-Open No. 2001-312253

SUMMARY OF THE INVENTION

Problems to be Solved by the Invention

FIG. 11 is a timing chart for describing the operation of a conventional liquid crystal display device that performs low frequency drive. Here, it is assumed that the refresh rate (also referred to as drive frequency) is 1 Hz. That is, a charging period with a length equal to one frame of a general display device with a refresh rate of 60 Hz (one frame is 16.67 ms) and a pause period of 59 frames appear alternately. Note that XF (X≥0) in FIG. 11 represents an X frame(s). Note also that IMD represents image data received by an LCD (Liquid Crystal Display) driver IC (Integrated Circuit) from an external host mainly composed of a CPU (Central Processing Unit), GCK, GCKB, GSP, and CLR represent signals outputted by the LCD driver IC to a gate driver, SO represents a signal outputted by a source driver in the LCD driver IC to a liquid crystal display panel, DAS represents power supplied by a power supply circuit in the LCD driver IC to a source driver, and BLC represents a signal outputted by a CABC (Content Adaptive Brightness Control) processing unit in the LCD driver IC to a backlight drive circuit.

In the conventional liquid crystal display device that performs low frequency drive, as shown in FIG. 11, even if image data IMD is transmitted from the host to the LCD driver IC during a pause period, writing of voltages into pixel capacitances to perform display according to the image data IMD needs to wait until the next charging period. Hence, when image data IMD is transmitted from the host to the LCD driver IC during a pause period, according to an instruction from a user, etc., since the time for a screen to change (hereinafter, referred to as "screen change time") is relatively long, the user feels that the response is slow.

An object of the present invention is therefore to provide a drive control device for a display device, a display device including the drive control device, and a drive control method that achieve a reduction in power consumption while reducing screen change time.

Solution to the Problems

According to a first aspect of the present invention, there is provided a drive control device for a display device, including a display control unit that performs control to refresh a screen of a display panel, based on image data received from an external source, the display panel including a plurality of scanning signal lines, a plurality of video signal lines, and a plurality of pixel formation portions provided for the plurality of scanning signal lines and the plurality of video signal lines, wherein the display control unit: includes a storage unit for holding the image data; generates a drive control signal for driving the display panel such that a charging period for refreshing the screen and a pause period for pausing the screen refresh appear alternately, the pause period having a predetermined length greater than or equal to the charging period; and performs, when receiving the image data during the pause period, an interrupt process where the pause period is allowed to transition to the charging period, immediately after receiving the image data.

According to a second aspect of the present invention, in the first aspect of the present invention, the display control unit includes an interface unit for receiving the image data from the external source, the interface unit being compliant with a DSI (Display Serial Interface) standard.

According to a third aspect of the present invention, in the second aspect of the present invention, the display control unit: receives the image data in packet units through the interface unit; and performs the interrupt process, based on data included in a packet for transmitting the image data, the data indicating that writing of the image data into the storage unit is first writing.

According to a fourth aspect of the present invention, in the first aspect of the present invention, the charging period includes a main charging period for writing voltages according to the image data into the plurality of pixel formation portions through the plurality of video signal lines.

According to a fifth aspect of the present invention, in the fourth aspect of the present invention, the drive control device further includes a video signal line driving unit that drives the plurality of video signal lines, according to the drive control signal.

According to a sixth aspect of the present invention, in the fifth aspect of the present invention, the drive control device further includes a power supply unit that supplies at least power for generating an analog signal, to the video signal line driving unit, wherein the power supply unit: supplies the power to the video signal line driving unit during at least the main charging period in the charging period; and stops the supply of the power to the video signal line driving unit during the pause period.

According to a seventh aspect of the present invention, in the sixth aspect of the present invention, at least the charging period transitioned from the pause period by the interrupt process includes a preliminary charging period during which writing of voltages according to the image data into the plurality of pixel formation portions is not performed, the preliminary charging period being provided immediately before the main charging period, and the power supply unit starts supply of the power to the video signal line driving unit during the preliminary charging period.

According to an eighth aspect of the present invention, in the seventh aspect of the present invention, the video signal line driving unit applies a predetermined voltage not related to the image data, during the preliminary charging period.

According to a ninth aspect of the present invention, in the eighth aspect of the present invention, the drive control device further includes an image quality correcting unit that performs, during a main charging period included in the charging period transitioned from the pause period by the interrupt process, an image quality correction according to image data received during the pause period.

According to a tenth aspect of the present invention, in the ninth aspect of the present invention, during a preliminary charging period included in the charging period transitioned from the pause period by the interrupt process, the image quality correcting unit performs in advance an image quality correction according to image data received during the pause period.

According to a eleventh aspect of the present invention, in the fourth aspect of the present invention, the drive control device further includes an image quality correcting unit having a function of performing, during amain charging period included in the charging period transitioned from the pause period by the interrupt process, an image quality correction according to image data received during the pause period.

According to a twelfth aspect of the present invention, there is provided a display device including: the drive control device according to any one of the first aspect to the eleventh aspect; the display panel; and a scanning signal line driving unit that drives the plurality of scanning signal lines, according to the drive control signal.

According to a thirteenth aspect of the present invention, in the twelfth aspect of the present invention, each pixel formation portion includes a thin film transistor having: a control terminal connected to one of the scanning signal lines; a first conduction terminal connected to one of the video signal lines; a second conduction terminal connected to a pixel electrode to which a voltage according to an image to be displayed is to be applied, the pixel electrode being provided in the display panel; and a channel layer formed of an oxide semiconductor.

According to fourteenth aspect of the present invention, there is provided a drive control method that performs control to refresh a screen of a display panel, based on image data received from an external source, the display panel including a plurality of scanning signal lines, a plurality of video signal lines, and a plurality of pixel formation portions provided for the plurality of scanning signal lines and the plurality of video signal lines, the method includes: a holding step of holding the image data in a predetermined storage unit; a step of driving the plurality of scanning signal lines such that a charging period for refreshing the screen and a pause period for pausing the screen refresh appear alternately, the pause period having a predetermined length greater than or equal to the charging period; and an interrupting step of performing, when the image data is received during the pause period, an interrupt process where the pause period is allowed to transition to the charging period, immediately after receiving the image data.

According to a fifteenth aspect of the present invention, in the fourteenth aspect of the present invention, the method further includes a receiving step of receiving the image data from the external source, according to a DSI (Display Serial Interface) standard.

According to sixteenth aspect of the present invention, in the fifteenth aspect of the present invention, in the receiving step, the image data is received in packet units, and in the interrupting step, the interrupt process is performed based on data included in a packet for transmitting the image data, the data indicating that writing of the image data into the storage unit is first writing.

Effects of the Invention

According to the first aspect of the present invention, the display device that performs low frequency drive performs, immediately after receiving image data from an external source during a pause period, an interrupt process where the pause period is allowed to transition to a charging period. Hence, without waiting for the pause period with a predetermined length to end, the next charging period starts. By this, a change to a screen according to the new image data can be performed more quickly than the conventional case. Therefore, a reduction in power consumption can be achieved while reducing screen change time.

According to the second aspect of the present invention, data transmission can be performed at high speed.

According to the third aspect of the present invention, an interrupt process can be performed based on data indicating that writing of the image data into the storage unit is the first writing.

According to the fourth aspect of the present invention, in a mode in which a charging period includes a main charging period, the same effects as those obtained in the first aspect of the present invention can be obtained.

According to the fifth aspect of the present invention, in a mode in which a video signal line driving unit is provided in the drive control device, the same effects as those obtained in the fourth aspect of the present invention can be obtained.

According to the sixth aspect of the present invention, since supply of power for generating an analog signal to the video signal line driving unit stops during a pause period, a further reduction in power consumption can be achieved.

According to the seventh aspect of the present invention, since supply of the power starts during a preliminary charging period included in at least a charging period transitioned from a pause period by an interrupt process, stable power can be obtained during a main charging period. Hence, a signal to be written into the pixel formation portions from the video signal line driving unit through the video signal lines during the main charging period is stabilized, enabling to suppress degradation in display quality.

According to the eighth aspect of the present invention, predetermined voltages not related to image data (e.g., voltages corresponding to a black image in the normally black mode) are written into the pixel formation portions during a preliminary charging period. Hence, a screen is once reset to, for example, a black image before a main charging period. By this, voltages required during the main charging period can be secured during the preliminary charging period, and thus, stable display that does not depend on an immediately preceding screen state can be performed.

According to the ninth or the eleventh aspect of the present invention, an image quality correction according to image data can be performed. Hence, an improvement in the image quality of an image can be achieved.

According to the tenth aspect of the present invention, during a preliminary charging period included in a charging period transitioned from a pause period by an interrupt process, an image quality correction according to image data received during the pause period before the transition is performed in advance. Hence, display with improved image quality can be immediately obtained during a main charging period included in the charging period transitioned from the pause period by the interrupt process.

According to the twelfth aspect of the present invention, the display device can obtain the same effects as those obtained in any of the first to the eleventh aspects of the present invention.

According to the thirteenth aspect of the present invention, as a thin film transistor in a pixel formation portion, a thin film transistor having a channel layer formed of an oxide semiconductor is used. Hence, a voltage written into the pixel formation portion can be sufficiently held. By this, even if a pause period with a length greater than or equal to a charging period is provided, degradation in image quality is less likely to occur.

According to the fourteenth to the sixteenth aspects of the present invention, the drive control method can obtain the same effects as those obtained in the first to the third aspects of the present invention.

MODES FOR CARRYING OUT THE INVENTION

Figure 1:
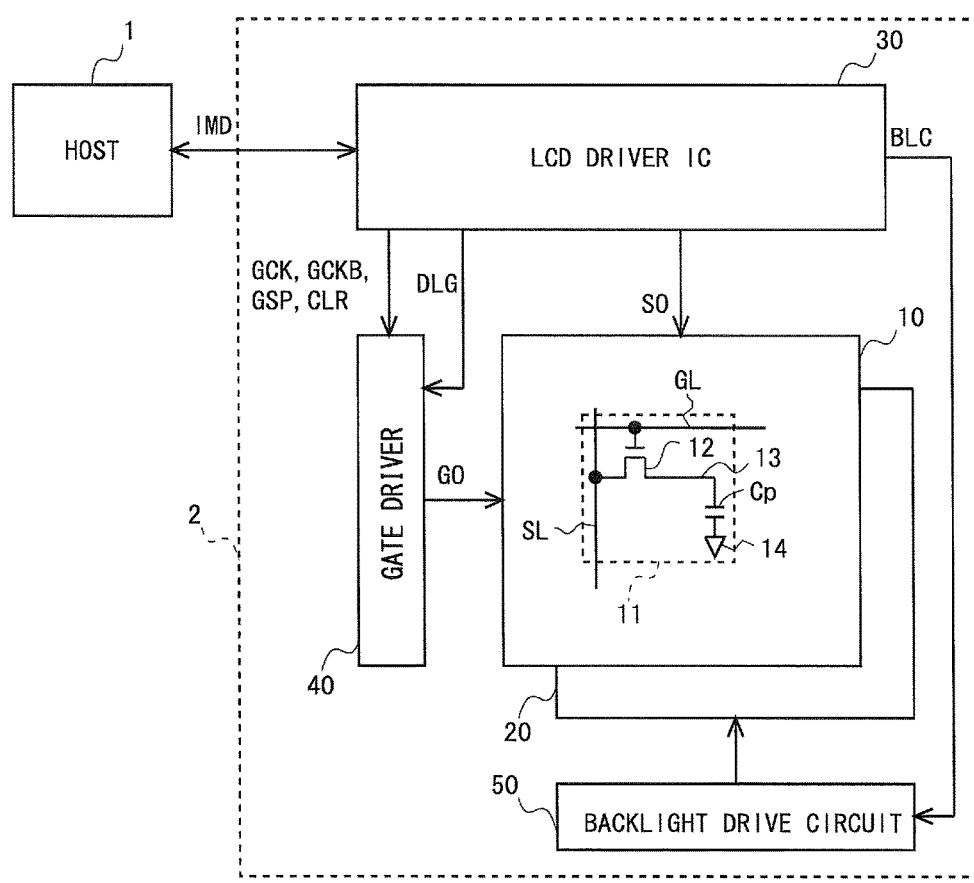
FIG. 1 is a block diagram for describing a configuration of a liquid crystal display device according to a first embodiment of the present invention.

First to third embodiments of the present invention will be described below with reference to the accompanying drawings. The "one frame" in the following embodiments refers to one frame (16.67 ms) of a general display device with a refresh rate of 60 Hz. In addition, XF (X≥0) in the drawings which is referred to in the following description represents an X frame(s).

<1. First Embodiment>
<1.1 Overall Configuration and Summary of Operation>

FIG. 1 is a block diagram showing a configuration of a liquid crystal display device 2 according to the first embodiment of the present invention. As shown in FIG. 1, the liquid crystal display device 2 includes a liquid crystal display panel 10, a backlight 20, an LCD driver IC 30 serving as a drive control device, a gate driver 40 serving as a scanning signal line driving unit, and a backlight drive circuit 50. The liquid crystal display device 2 is a liquid crystal display device that performs low frequency drive. A host 1 mainly composed of a CPU is provided outside the liquid crystal display device 2.

In the liquid crystal display panel 10, there are formed a plurality of source lines SL serving as video signal lines; a plurality of gate lines GL serving as scanning signal lines; and a plurality of pixel formation portions 11 provided at the respective intersections of the plurality of source lines SL and the plurality of gate lines GL. For the sake of convenience, FIG. 1 shows only one pixel formation portion 11. The plurality of pixel formation portions 11 are arranged in a matrix. Each pixel formation portion 11 is composed of a TFT 12 whose gate terminal serving as a control terminal is connected to a gate line GL passing through a corresponding intersection, and whose source terminal serving as a first conduction terminal is connected to a source line SL passing through the intersection; a pixel electrode 13 connected to a drain terminal serving as a second conduction terminal of the TFT 12; a common electrode 14 provided to be shared by the plurality of pixel formation portions 11; and a liquid crystal layer provided to be shared by the plurality of pixel formation portions 11, and sandwiched between the pixel electrode 13 and the common electrode 14. By a liquid crystal capacitance formed by the pixel electrode 13 and the common electrode 14, a pixel capacitance Cp is formed. Note that typically an auxiliary capacitance is provided in parallel with the liquid crystal capacitance so as to securely hold a voltage in the pixel capacitance Cp.

In the present embodiment, an oxide TFT is used as the TFT 12. More specifically, the channel layer of the TFT 12 is formed of IGZO having, as the main components, indium (In), gallium (Ga), zinc (Zn), and oxygen (O). In the following, a TFT using IGZO as a channel layer is referred to as an "IGZO-TFT". Since a silicon-based TFT has relatively high off-leakage current, when a silicon-based TFT is used as the TFT 12, the charge held in the pixel capacitance Cp leaks out through the TFT 12, resulting in a change in voltage to be held during an off state. However, the IGZO- TFT has far low off-leakage current, compared to the silicon-based TFT. Hence, the IGZO-TFT can hold the voltage written into the pixel capacitance Cp for a longer period of time. Note that even when using an oxide semiconductor other than IGZO, for example, an oxide semiconductor including at least one of indium, gallium, zinc, copper (Cu), silicon (Si), tin (Sn), aluminum (Al), calcium (Ca), germanium (Ge), and lead (Pb), as the channel layer, the same effect can be obtained.

The LCD driver IC 30 receives image data IMD from the host 1, and accordingly, generates and outputs gate clock signals GCK and GCKB, a gate start pulse signal GSP, a gate clear signal CLR, a backlight control signal BLC, a source output signal SO, and gate power DLG. The source output signal SO is applied to the source lines SL. Note that although the LCD driver IC 30 receives various types of control data from the host 1 in addition to the image data IMD or transmits the control data to the host 1, in the following, description is made while mainly focusing on the image data IMD. Here, transmission and reception of data between the host 1 and the LCD driver IC 30 are performed through an interface compliant with the DSI (Display Serial Interface) standard which is proposed by the MIPI (Mobile Industry Processor Interface) Alliance. According to the interface compliant with the DSI standard, high-speed data transmission can be performed. In the present embodiment, a command mode of the interface compliant with the DSI standard is used.

The gate driver 40 repeats application of an active gate output signal GO to the gate lines GL in predetermined cycles, based on the gate clock signals GCK and GCKB, the gate start pulse signal GSP, and the gate clear signal CLR (hereinafter, collectively referred to as "gate driver control signals") which are outputted from the LCD driver IC 30. Note that the gate driver 40 may be integrally formed with the liquid crystal display panel 10. A detailed description of the operation of the gate driver 40 will be made later.

The backlight 20 is provided on the back side of the liquid crystal display panel 10, and irradiates backlight onto the back of the liquid crystal display panel 10. The backlight 20 typically includes a plurality of LEDs (Light Emitting Diodes).

The backlight drive circuit 50 outputs a signal (e.g., a current signal) that controls the luminances of the LEDs to the backlight 20, based on the backlight control signal BLC outputted from the LCD driver IC 30. Specifically, current values to be supplied to the respective LEDs in the backlight 20 are determined according to the backlight control signal BLC which is a PWM (Pulse Width Modulation) signal. Note that the luminances of the plurality of LEDs in the backlight 20 may be controlled separately or may be controlled uniformly.

By applying the source output signal SO to the source lines SL, applying the gate output signal GO to the gate lines GL, and controlling the luminances of the LEDs in the backlight 20 by the backlight drive circuit 50 in the above-described manner, a screen according to the image data IMD transmitted from the host 1 is displayed on the liquid crystal display panel 10.

<1.2 Configuration of the LCD Driver IC>

Figure 2:
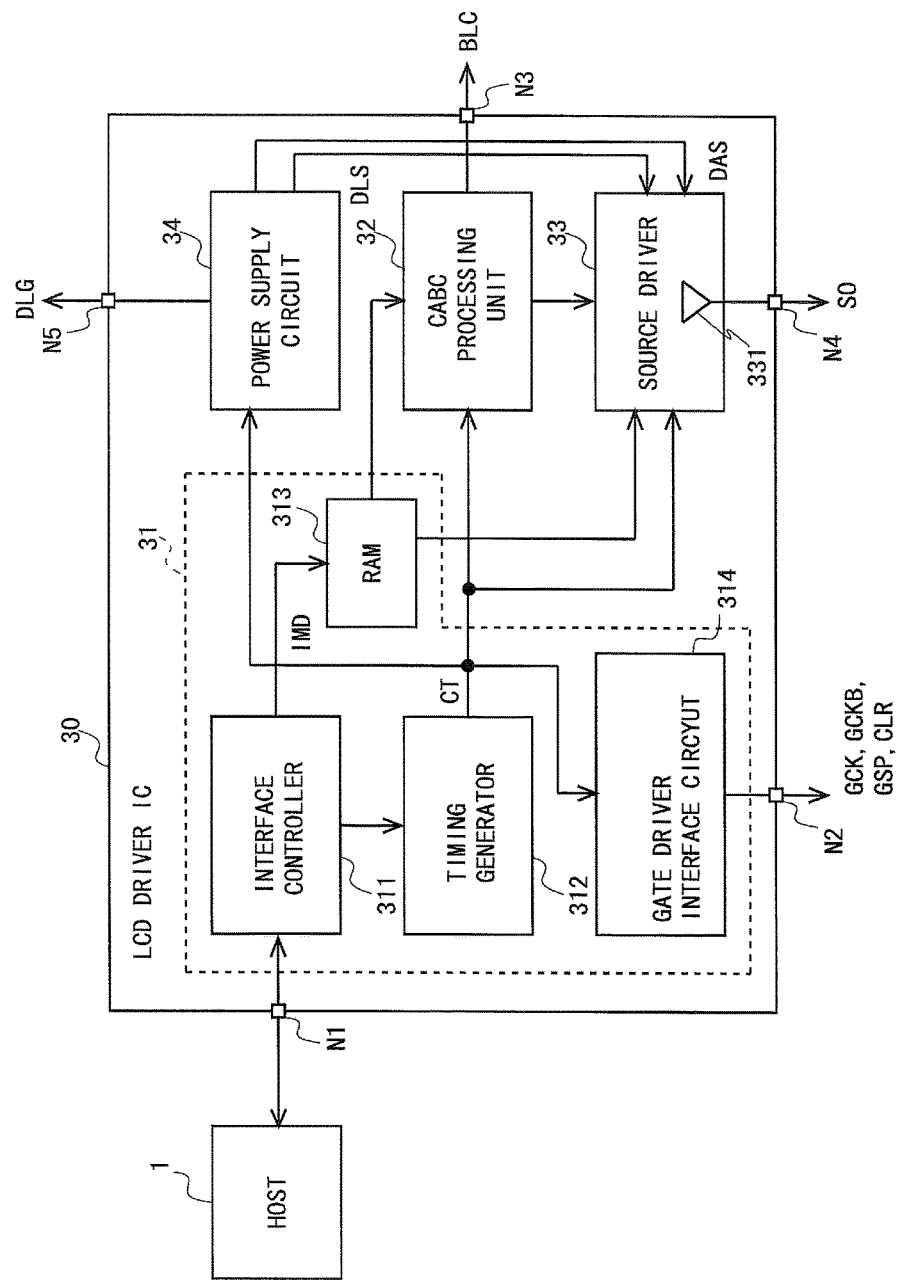
FIG. 2 is a block diagram for describing a configuration of an LCD driver IC of the first embodiment.

FIG. 2 is a block diagram showing a configuration of the LCD driver IC 30. The LCD driver IC 30 of the present embodiment supports, as described above, the command mode of the DSI standard. As shown in FIG. 2, the LCD driver IC 30 includes a display control circuit 31, a power supply circuit 34, a CABC processing unit 32 serving as an image correcting unit, and a source driver 33 serving as a video signal line driving unit. It should be noted, however, that the configuration of the LCD driver IC 30 supporting the command mode of the DSI standard is not limited to the example shown here. The LCD driver IC 30 includes one input/output node N1 and four output nodes N2 to N5. Although FIG. 2 shows each of the input/output node N1 and the output nodes N2 to N5 as a single node, in practice there may be a plurality of nodes. For example, the number of output nodes N4 for the outputs of the source driver 33 is the same as the number of the source lines SL. In addition, the source driver 33 may be provided outside the LCD driver IC 30. In this case, the source driver 33 may be integrally formed with the liquid crystal display panel 10. In addition, the gate driver 40 may be provided in the LCD driver IC 30.

The display control circuit 31 includes an interface controller 311 serving as an interface unit, a timing generator 312, a RAM (Random Access Memory) 313 serving as a storage unit, and a gate driver interface circuit 314.

The interface controller 311 is compliant with the DSI standard. The interface controller 311 writes image data IMD received from the host 1 into the RAM 313. At the same time, the interface controller 311 transmits a panel rendering start signal to the timing generator 312. Note that even when the interface controller 311 does not receive image data IMD, the interface controller 311 transmits a panel rendering start signal to the timing generator 312 in fixed cycles (1 Hz in the present embodiment).

Figure 3:
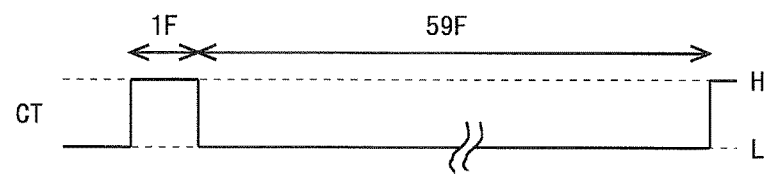
FIG. 3 is a diagram for describing a drive control signal of the first embodiment.

The timing generator 312 transmits a drive control signal CT to the gate driver interface circuit 314, the power supply circuit 34, the CABC processing unit 32, and the source driver 33, according to the panel rendering start signal received from the interface controller 311. The drive control signal CT in the present embodiment is, for example, the one shown in FIG. 3, and takes either one of a high level (H) and a low level (L). Specifically, the drive control signal CT goes to a high level for one frame immediately after the timing generator 312 receives a panel rendering start signal, and goes to a low level for 59 frames before receiving a panel rendering start signal next. By the timing generator 312, various types of processes in frame units are implemented.

The gate driver interface circuit 314 generates gate driver control signals. Specifically, when the drive control signal CT is at a high level, the gate driver interface circuit 314 generates gate driver control signals. When the drive control signal CT is at a low level, the gate driver interface circuit 314 does not generate gate driver control signals. Note, however, that instead of this, when the drive control signal CT is at a low level, gate driver control signals having a fixed potential may be generated. The gate driver control signals are transmitted to the gate driver 40 through the output node N2.

The CABC processing unit 32 generates a backlight control signal BLC, according to the drive control signal CT. Specifically, when the drive control signal CT is at a high level, the CABC processing unit 32 reads the image data IMD from the RAM 313, and generates and outputs a backlight control signal BLC according to the image data IMD. The backlight control signal BLC is generated as, for example, a PWM signal as described above. When the drive control signal CT is at a low level, the CABC processing unit 32 continuously outputs an immediately preceding backlight control signal BLC which is obtained when the drive control signal CT is at a high level, without reading the image data IMD. The backlight control signal BLC is transmitted to the backlight drive circuit 50 through the output node N3. In addition, the backlight control signal BLC or a predetermined signal according to the image data IMD which is obtained by the CABC processing unit 32 in the process of generating the backlight control signal BLC (hereinafter, referred to as a "luminance correction signal" when these signals are not distinguished from each other) is transmitted to the source driver 33. The process such as the above-described one in which the CABC processing unit 32 generates a luminance correction signal (backlight control signal BLC) is hereinafter referred to as a "CABC process". By the CABC process, the luminance control of the backlight 20 according to the image data IMD is performed and a correction of a source output signal SO is performed as will be described later, by which a reduction in the power consumption of the backlight 20 and an improvement in the image quality of an image can be achieved. Note, however, that the CABC process is not essential for the present invention.

The source driver 33 includes an output amplifier 331 for wave-shaping or stepping up a source output signal SO and outputting the resulting source output signal SO. Note that although FIG. 2 shows only one output amplifier 331, in practice the same number of output amplifiers 331 as the number of the source lines SL are provided. The source driver 33 generates a source output signal SO, according to the drive control signal CT. Specifically, when the drive control signal CT is at a high level, the source driver 33 reads the image data IMD from the RAM 313, and corrects the image data IMD, based on the luminance correction signal received from the CABC processing unit 32. By correcting the image data IMD based on the luminance correction signal, image data IMD according to backlight luminance control by the CABC process can be obtained. Such a correction of the image data IMD may be performed by the CABC processing unit 32. Note that in the following the expression "image data IMD is corrected by a luminance correction signal" may be referred to as "a source output signal SO is corrected by a luminance correction signal". Then, the source driver 33 allows a shift register, a sampling latch circuit, and the like, which are not shown and which are included in the source driver 33 to operate based on, for example, a source start pulse signal SSP, a source clock signal SCK, and a latch strobe signal LS which are not shown and which are transmitted from the timing generator 312, and converts an obtained digital signal to an analog signal by a DA conversion circuit which is not shown, and thereby generates a source output signal SO. Note that the source start pulse signal SSP, the source clock signal SCK, and the latch strobe signal LS may be generated in the source driver 33, according to the drive control signal CT. The source output signal SO is wave-shaped or stepped up by the output amplifier 331 in the source driver 33 and then the resulting source output signal SO is applied to the source lines SL through the output node N4.

The power supply circuit 34 generates, according to the drive control signal CT, source power DAS and DLS, gate power DLG, and the like, as, for example, voltages obtained by stepping up a clock signal by a charge pump scheme. The source power DAS is analog power (high voltage) used by the above-described DA conversion circuit, the output amplifier 331, and the like. The source power DLS is logic power (power of two types, a high level and a low level) used by the above-described shift register, sampling latch circuit, and the like, included in the source driver 33. In the following, the source power DAS and DLS are referred to as "analog source power" and "logic source power", respectively. The gate power DLG is logic power (power of two types, a high level and a low level) used by a shift register and the like, which are not shown and which are included in the gate driver 40. When the drive control signal CT is at a high level, the power supply circuit 34 supplies the analog source power DAS to the source driver 33. When the drive control signal CT is at a low level, the power supply circuit 34 does not perform such supply. The power supply circuit 34 supplies the logic source power DLS at all times, regardless of the drive control signal CT. By this, the circuit operation of the source driver 33 can be stabilized. Likewise, the power supply circuit 34 supplies the gate power DLG to the gate driver 40 through the output node N5 at all times, regardless of the drive control signal CT. By this, the circuit operation of the gate driver 40 can be stabilized. It should be noted, however, that the methods for supplying the logic source power DLS and the gate power DLG are not limited to the examples described here.

<1.3 Operation>

Figure 4:
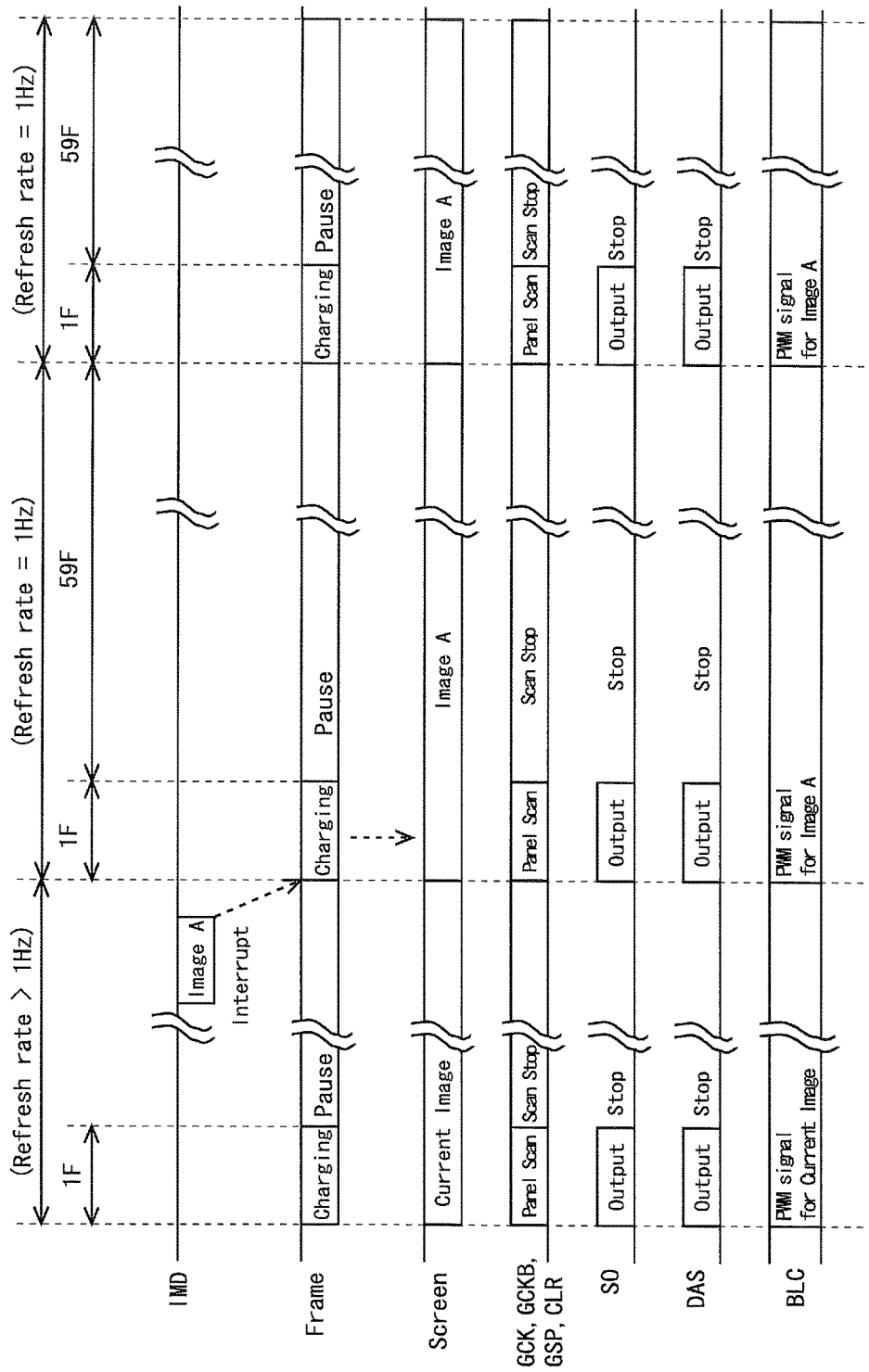
FIG. 4 is a timing chart for describing the operation of the liquid crystal display device according to the first embodiment.

FIG. 4 is a timing chart for describing the operation of the liquid crystal display device 2 according to the present embodiment and the host 1. FIG. 4 shows, from the top, image data IMD transmitted from the host 1 to the LCD driver IC 30, the drive state of the liquid crystal display panel 10 for each frame, the screen state of the liquid crystal display panel 10, gate driver control signals, a source output signal SO, analog source power DAS, and a backlight control signal BLC (the same is also applied to FIGS. 8 and 10 which will be described later). In the present embodiment, as described above, the liquid crystal display panel 10 is driven such that a charging period during which screen refresh is performed and a pause period during which the screen refresh is paused appear alternately. In addition, in the present embodiment, immediately after image data IMD is transmitted from the host 1 to the LCD driver IC 30 during a pause period, an interrupt process where the pause period is forced to transition to a charging period is performed. The interrupt process will be described in detail later. It is assumed that the refresh rate for when an interrupt process is not performed is 1 Hz. That is, the gate driver 40 operates such that a one-frame charging period and a 59-frame pause period appear alternately. The length of such a charging period and the length of such a pause period for when an interrupt process is not performed are predetermined. In addition, in the following description, image data IMD that is newly written into the RAM 313 by an interrupt process is referred to as "new image data", and image data IMD that is held in the RAM 313 during a pause period and during a charging period transitioned from the pause period without performing an interrupt process is referred to as "current image data".

When new image data IMD is not transmitted from the host 1 to the LCD driver IC 30, image display is performed based on current image data IMD (Current Image) already held in the RAM 313. First, during a charging period, the gate lines GL are scanned (sequentially selected) based on gate driver control signals. The start timing of the charging period is determined by a gate start pulse signal GSP included in the gate driver control signals. In addition, since analog source power DAS is supplied to the source driver 33 during the charging period, a source output signal SO generated based on current image data IMD is applied to the source lines SL. Since a luminance correction signal (backlight control signal BLC) according to the current image data IMD is generated during the charging period, corrections of the light emission of the backlight 20 and the source output signal SO according to the luminance correction signal are performed. When TFTs 12 in pixel formation portions 11 provided to a selected gate line GL are placed in an on state, voltages of the source output signal SO applied to the source lines SL are written into pixel capacitances Cp in the pixel formation portions 11. By this, an image according to the current image data IMD is displayed. The voltages written into the pixel capacitances Cp are held until the corresponding gate lines GL are selected next. After finishing the selection of the last gate line GL, the charging period ends by a gate clear signal CLR included in the gate driver control signals. The charging period continues for one frame as described above. By holding the image data IMD in the RAM 313, when a screen change is not required, image display can be performed without transmitting image data IMD again from the host 1 to the LCD driver IC 30.

During a pause period, supply of the gate driver control signals is stopped or the gate driver control signals are set to a fixed potential, and accordingly, scanning of the gate lines GL is not performed. That is, a source output signal SO is not written into the pixel capacitances Cp during the pause period. Note, however, that since, as described above, the voltages written into the pixel capacitances Cp are held, the image according to the current image data IMD is continuously displayed. During the pause period, since a luminance correction signal according to the current image data IMD is generated continuously from the immediately preceding charging period, light emission of the backlight 20 according to the luminance correction signal is performed. Note that at this time since the output of a source output signal SO is stopped, a correction of the source output signal SO is not required. Note also that since in the present embodiment IGZO-TFTs are used as the TFTs 12, the voltages written into the pixel capacitances Cp can be sufficiently held. When an interrupt process is not performed during a pause period, the pause period continues for 59 frames. When the pause period ends, the next charging period starts. By thus providing a pause period sufficiently longer than a charging period, the refresh rate (drive frequency) can be reduced. Hence, power consumption is reduced. In addition, since analog source power DAS is not supplied to the source driver 33 during the pause period, power consumption is further reduced. Note that although a charging period in the present embodiment and embodiments which will be described later in practice includes a bit of a pause period, this is not essential.

Then, when new image data IMD (Image A) is transmitted from the host 1 to the LCD driver IC 30, image display is performed based on the new image data IMD. That is, the screen of the liquid crystal display panel 10 is updated. In addition, in the present embodiment, immediately after new image data IMD is transmitted during a pause period, an interrupt process where the drive state of the liquid crystal display panel 10 is allowed to transition to a charging period is performed. Note, however, that the term "immediately after" as used herein refers to, for example, "one frame after". The reason that a transition to the charging period thus requires one frame is because writing of the image data IMD into the RAM 313, synchronization for starting the charging period, etc., are required. Note that, when new image data IMD is received over two consecutive frames, for example, a transition to a charging period is made after the latter frame ends. In this case, as shown in FIG. 4, the period required to transition to the charging period by an interrupt process is one frame+Y frame ($0<Y\leq1$). Note, however, that the period required to transition to the charging period by an interrupt process is not limited to the example described here, and the drive state of the liquid crystal display panel 10 may be allowed to transition to a charging period in a period of time shorter than one frame.

Transmission and reception of image data IMD between the host 1 and the LCD driver IC 30 are performed based on the DSI standard as described above. In the DSI standard, data is transmitted and received in packet units. The packet configuration defined in the DSI standard has two types, a short packet and a long packet. A short packet is composed of 4-byte (fixed) data, and is mainly used for transmission and reception of various types of control signals. A long packet is composed of data of up to 65535+6 bytes, and is used for transmission and reception of image data, etc. The transmission and reception of image data IMD in the present embodiment use a long packet.

Figure 5:
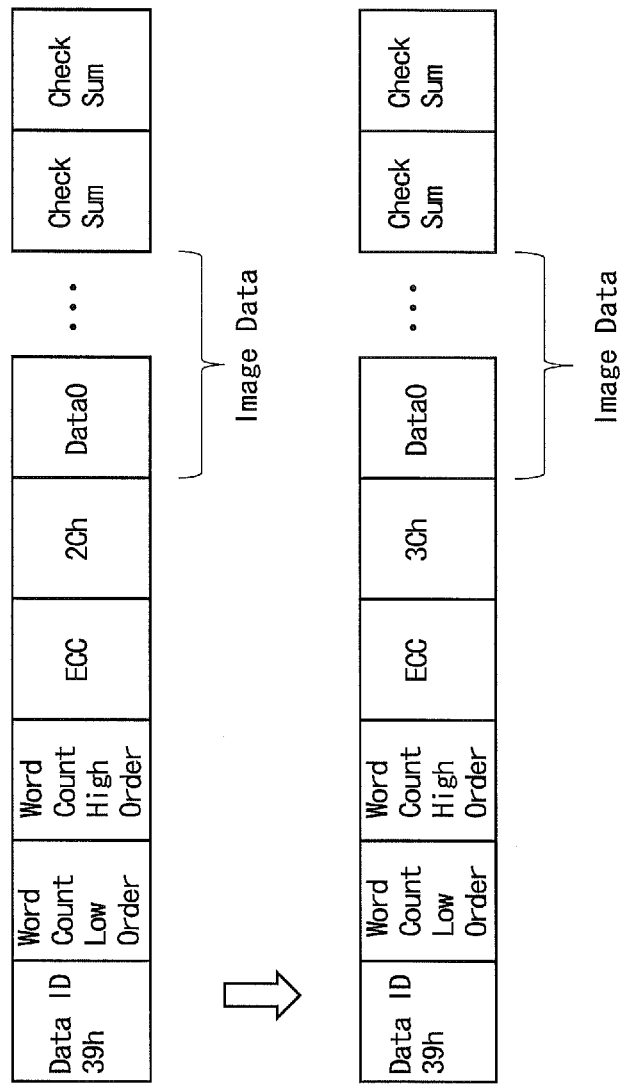
FIG. 5 is a diagram showing a packet configuration in the first embodiment.

FIG. 5 is a diagram showing a configuration of a long packet used for the transmission of image data IMD in the present embodiment. The data size of each rectangular box shown in FIG. 5 is one byte. The "Data ID" indicates the type of packet. When the "Data ID" is "39h" as in the present embodiment, it means that the packet is a long packet, and data to be written into the RAM 313 (which may be other storage units not shown in FIG. 2) is transmitted by the long packet. The "Word Count low order" and the "Word Count high order" are to specify the number of bytes of data (note that the number of bytes also includes the number of bytes of "2Ch" or "3Ch" which will be described later) to be actually transmitted by the long packet. The maximum number of bytes specified here is 65535 bytes. The "2Ch" and the "3Ch" will be described later. The "Data n" ($0\leq n\leq 65534$) is data to be actually transmitted by the long packet, and corresponds to image data IMD in the present embodiment. Here, the maximum size of image data IMD transmittable by one long packet is 65534 bytes. When the size exceeds 65534 bytes, the image data IMD is transmitted by being divided into two or more long packets. The "2Ch" indicates the first long packet regardless of the size of image data IMD. In this case, writing of the image data IMD is performed from the start address of the RAM 313. The "3Ch" indicates the second or subsequent long packet for a series of image data IMD. In this case, writing is performed from an address following the address of the RAM 313 where image data IMD transmitted by the preceding long packet is written. The "Check Sum" is to detect an error in the "Data n" portion.

An interrupt process in the present embodiment is specifically performed as follows. When the host 1 issues new image data IMD (image A) during a pause period, the image data IMD is transmitted to the interface controller 311 in the LCD driver IC 30, using a long packet shown in FIG. 5. After the interface controller 311 recognizes the "Data ID: 39h" of the received long packet, at the stage where "2Ch" is received, the interface controller 311 performs the process of allowing the drive state of the liquid crystal display panel 10 to transition from the pause period to a charging period. Specifically, the interface controller 311 allows the drive state of the liquid crystal display panel 10 to transition from the pause period to a charging period by transmitting the above-described panel rendering start signal to the timing generator 312. Note that at the same time the interface controller 311 writes the image data IMD included in the "Data n" portion into the RAM 313. The above is an interrupt process. Note that, when such an interrupt process is performed, since the pause period becomes shorter than the predetermined length (59 frames), the refresh rate for when the interrupt process is performed becomes higher than the predetermined one (1 Hz in the present embodiment). In the conventional case, such an interrupt process is not performed. Thus, even if image data IMD is transmitted from the host 1 to the LCD driver IC 30 during a pause period, the next charging period does not start until the pause period with the predetermined length ends.

During the charging period after the interrupt process, as shown in FIG. 4, voltages of a source output signal SO generated based on the image data IMD (Image A) which is newly written into the RAM 313 are written into the pixel capacitances Cp in the pixel formation portions 11. By this, an image according to the new image data IMD is displayed. Note that the operation performed during the charging period after the interrupt process is basically the same as the above-described operation performed during a charging period for current image data IMD (Current Image), and thus, other description is omitted. Note, however, that during the charging period, since a luminance correction signal (backlight control signal BLC) according to the newly written image data IMD is generated, corrections of the light emission of the backlight 20 and the source output signal SO according to the luminance correction signal are performed. Note that the pause period is also the same as that described above, except that an image to be displayed corresponds to the image data IMD newly written into the RAM 313, and thus, description thereof is omitted.

<1.4 Effects>

According to the present embodiment, in the liquid crystal display device 2 that performs low frequency drive, when image data IMD is transmitted from the host 1 to the LCD driver IC 30 during a pause period, an interrupt process is performed. Hence, without waiting for the pause period with a predetermined length to end, the next charging period where refresh based on the new image data IMD is to be performed starts. By this, a change to a screen according to the new image data IMD is performed more quickly than the conventional case. Therefore, a reduction in power consumption can be achieved while reducing screen change time.

In addition, according to the present embodiment, since a pause period (59 frames) sufficiently longer than a charging period (one frame) is set, the refresh rate can be sufficiently reduced. Hence, a reduction in power consumption can be sufficiently achieved.

In addition, according to the present embodiment, since supply of analog source power DAS to the source driver 33 by the power supply circuit 34 is stopped during a pause period, a further reduction in power consumption can be achieved.

In addition, according to the present embodiment, since IGZO-TFTs are used as the TFTs 12 in the pixel formation portions 11, voltages written into the pixel capacitances Cp can be sufficiently held. Hence, even if a pause period longer than a charging period is provided, degradation in image quality is less likely to occur.

In addition, according to the present embodiment, by performing a CABC process, the luminance of the backlight 20 is controlled and image data IMD is corrected. Thus, a reduction in the power consumption of the backlight 20 and an improvement in the image quality of an image can be achieved.

<1.5 Variant>

Figure 6:
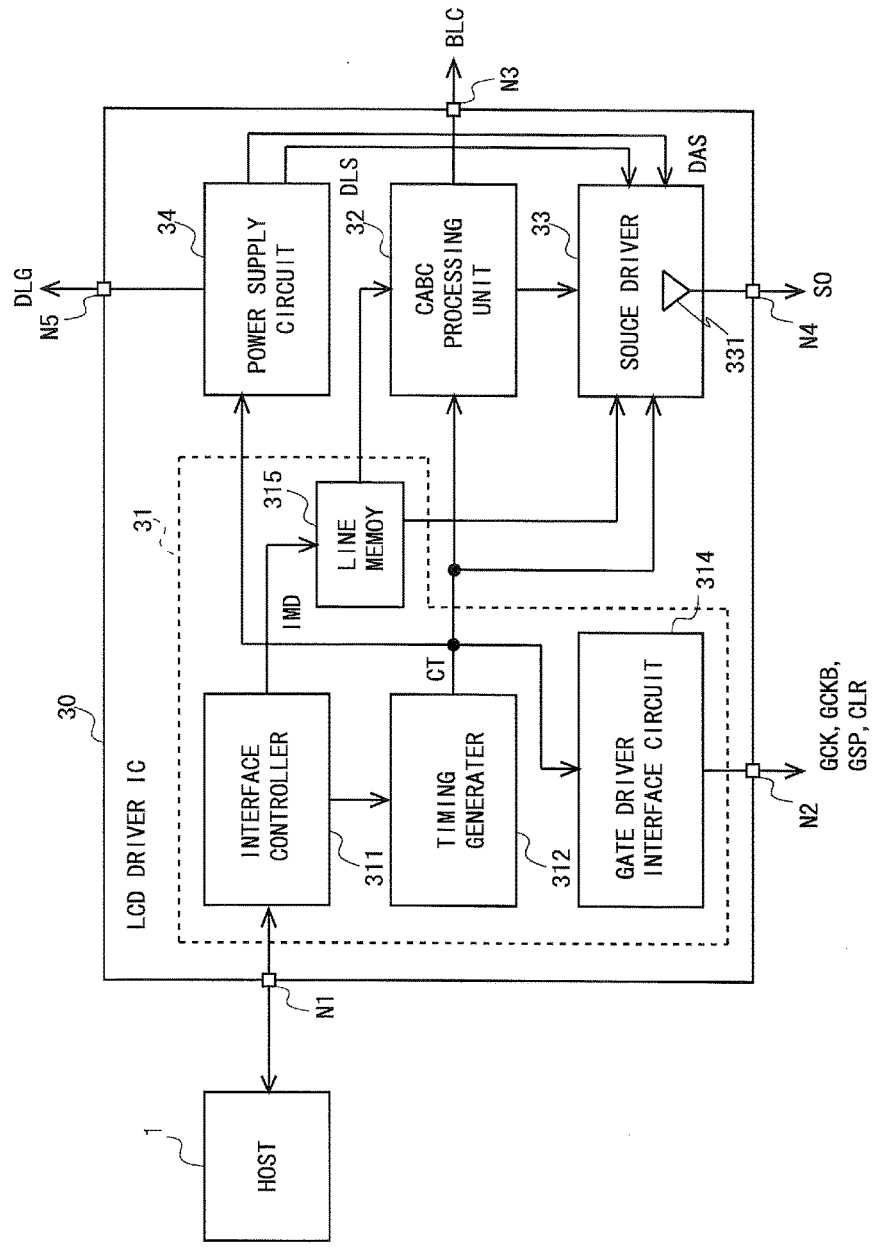
FIG. 6 is a block diagram for describing a configuration of an LCD driver IC of a variant of the first embodiment.

FIG. 6 is a block diagram showing a configuration of an LCD driver IC 30 of a variant of the first embodiment of the present invention. While the LCD driver IC 30 of the first embodiment supports the command mode of the DSI standard, the LCD driver IC 30 of the present variant supports a video mode of the DSI standard. The LCD driver IC 30 of the present variant is provided with a line memory 315 serving as a storage unit, instead of the RAM 313. Other configurations are the same as those of the first embodiment, and thus, are denoted by the same reference characters and description thereof is omitted. It should be noted that the configuration of the LCD driver IC 30 supporting the video mode of the DSI standard is not limited to the example shown here.

In the video mode, image data IMD to be transmitted from a host 1 to the LCD driver IC 30 is RGB data. The image data IMD is held, for example, in the line memory 315 on a line-by-line basis. In addition, the image data IMD held in the line memory 315 is read on a line-by-line basis. An interrupt process in the present variant is performed as follows. When the host 1 issues new image data IMD (image A) during a pause period, the image data IMD which is RGB data is transmitted to an interface controller 311 in the LCD driver IC 30. At the stage where the interface controller 311 receives the image data IMD, the interface controller 311 performs the process of allowing the drive state of a liquid crystal display panel 10 to transition from the pause period to a charging period. In addition, the interface controller 311 writes the RGB data into the line memory 315. Note that, since the video-mode image data IMD is RGB data, "Data ID: 39h" and "2Ch" in the above-described command mode are not used in the present variant. The above is an interrupt process of the present variant. As such, the operation in the present variant is basically the same as that in the first embodiment, except that the type of image data IMD is RGB data and the writing and reading of image data are performed on a line-by-line basis.

In the above-described manner, according to the present variant, the same effects as those obtained in the first embodiment can be obtained in the video mode.

<2. Second embodiment>

<2.1 Operation>

Figure 7:
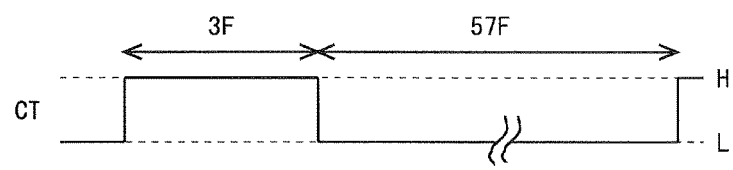
FIG. 7 is a diagram for describing a drive control signal of a second embodiment of the present invention.

FIG. 7 is a diagram showing a drive control signal CT of the second embodiment of the present invention. Note that a liquid crystal display device 2 according to the present embodiment differs from that of the above-described first embodiment only in the operation thereof, and the components thereof are the same as those of the first embodiment. Hence, of the components of the present embodiment, the same components as those of the first embodiment are denoted by the same reference characters and description thereof is omitted where appropriate. As shown in FIG. 7, the drive control signal CT of the present embodiment goes to a high level for three frames immediately after a timing generator 312 receives a panel rendering start signal, and goes to a low level for 57 frames until receiving a panel rendering start signal next.

Figure 8:
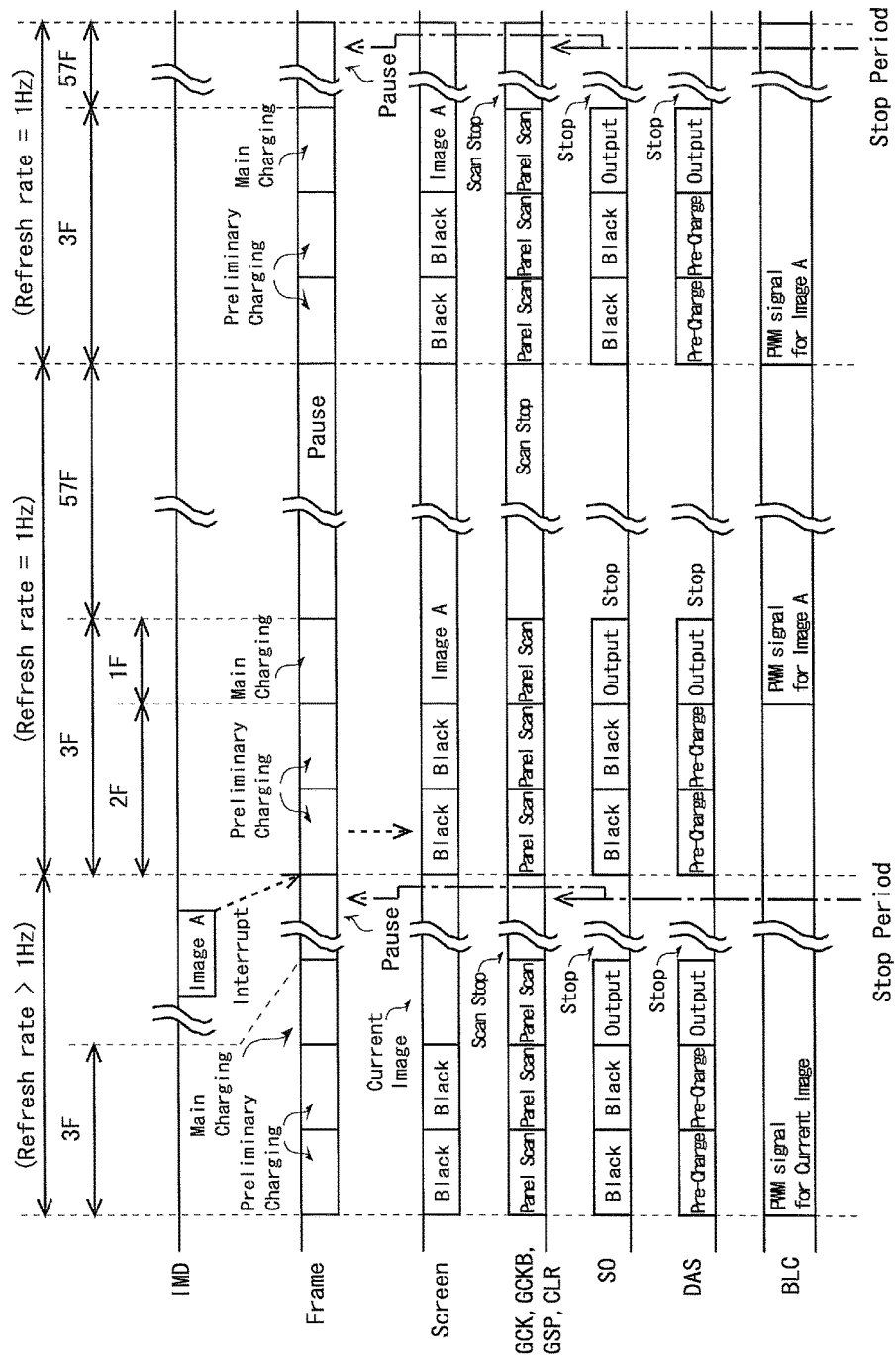
FIG. 8 is a timing chart for describing the operation of a liquid crystal display device according to the second embodiment.

FIG. 8 is a timing chart for describing the operation of the liquid crystal display device 2 according to the present embodiment and a host 1. Three frames are provided for a charging period in the present embodiment, and 57 frames are provided for a pause period for when an interrupt process is not performed. Of the three-frame charging period, the first two frames are a preliminary charging period, and the subsequent one frame is a main charging period. The main charging period corresponds to a one-frame charging period in the above-described first embodiment. Since writing of voltages according to image data IMD is performed during the main charging period (one frame), in the present embodiment the refresh rate for when an interrupt process is not performed is 1 Hz as in the first embodiment.

Figure 9:
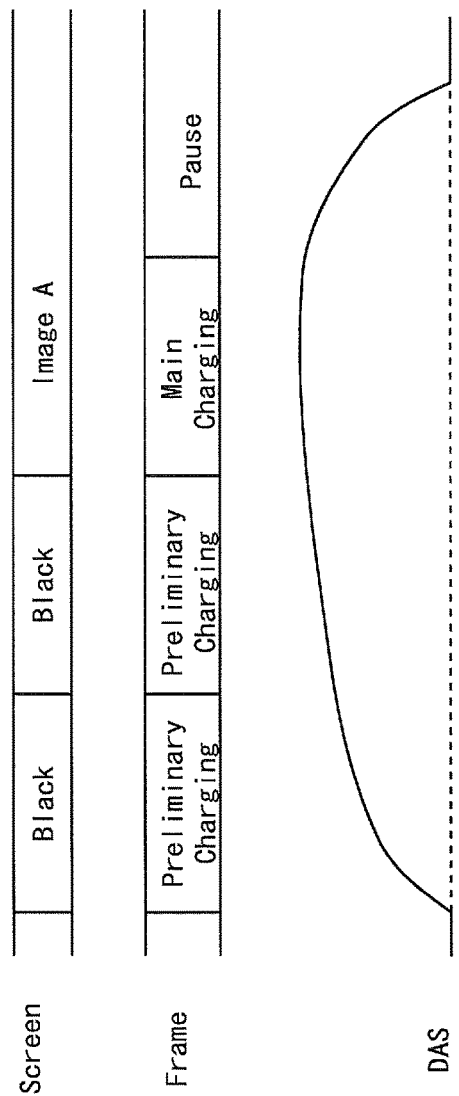
FIG. 9 is a timing chart for describing pre-charge operation in the second embodiment.

In addition, during the preliminary charging period which is a period immediately before starting the main charging period, supply of analog source power DAS by a power supply circuit 34 starts. In this specification, the operation where supply of analog source power DAS by the power supply circuit 34 is thus started in advance before starting the main charging period is referred to as "pre-charge operation". FIG. 9 is a timing chart for describing pre-charge operation in the present embodiment. Analog source power DAS is a high voltage compared to logic source power DLS, etc., and thus requires a certain amount of time to reach a desired voltage from the start of supply, i.e., to obtain a stable voltage. Hence, in the present embodiment, as shown in FIG. 9, by performing pre-charge operation during a two-frame preliminary charging period, stable analog source power DAS can be obtained during a main charging period. Such pre-charge operation is more effective for an output amplifier 331 that requires power of a higher voltage than a DA conversion circuit. Note that it is not necessary to provide two frames for a preliminary charging period, and for example, one frame or three frames may be provided.

It is desirable that, during a preliminary charging period, for example, gate lines GL be scanned, and a source output signal SO which is voltages not related to image data IMD (e.g., black voltages which are voltages corresponding to a black image in the normally black mode) be generated by a DA conversion circuit and the output amplifier 331 which operate by analog source power DAS and be applied to source lines SL from a source driver 33. By this, a screen is once reset to a black image before a main charging period, and thus, stable display that does not depend on a screen state for an immediately preceding pause period can be performed. Note that, since an output of the output amplifier 331 is not placed in a high impedance state because the source output signal SO is outputted, unlike the case of stopping the output of the source output signal SO, even if the gate lines GL are scanned, display does not become unstable. Note, however, that during the preliminary charging period, the gate lines GL may not be scanned and the output of the source output signal SO may be stopped. In addition, when voltages held in pixel capacitances Cp during the immediately preceding pause period are black voltages (i.e., the potential of pixel electrodes 13 and the potential of a common electrode 14 are equal to each other), even if the output amplifier 331 is in a high impedance state, the voltages held in the pixel capacitances Cp do not change. Thus, the output of the source output signal SO may be stopped regardless of whether to scan the gate lines GL.

For a charging period transitioned from a pause period without performing an interrupt process, during both of a preliminary charging period and a main charging period, a luminance correction signal (backlight control signal BLC) according to current image data IMD is generated, and corrections of the light emission of a backlight 20 and a source output signal SO according to the luminance correction signal are performed. For a charging period transitioned from a pause period by an interrupt process, a luminance correction signal according to current image data IMD is generated, and corrections of the light emission of the backlight 20 and a source output signal SO according to the luminance correction signal are performed. This is because during a preliminary charging period, display according to new image data IMD is not yet performed. Note that a luminance correction signal for a pause period is the same as that of the first embodiment, and the same luminance correction signal as that generated during an immediately preceding charging period is continuously generated.

<2.2 Effects>

According to the present embodiment, a charging period includes a preliminary charging period and a main charging period, and pre-charge operation is performed during the preliminary charging period. Hence, stable analog source power DAS is obtained during the main charging period. By this, a source output signal SO to be written into pixel capacitances Cp during the main charging period is stabilized, enabling to suppress degradation in display quality.

In addition, since black voltages are written into pixel capacitances Cp during the preliminary charging period, a screen is once reset to a black image before the main charging period. By this, voltages required during the main charging period can be secured during the preliminary charging period, and thus, stable display that does not depend on an immediately preceding screen state can be performed. Note that although in FIG. 8, regardless of whether an interrupt process takes place, a preliminary charging period is provided and writing of black voltages is performed, the present invention is not limited thereto. For example, writing of black voltages may be performed only during a preliminary charging period included in a charging period transitioned from a pause period by an interrupt process, and scanning of the gate lines GL may not be performed during other preliminary charging periods. In addition, for example, a preliminary charging period may be provided only when an interrupt process takes place.

<3. Third embodiment>

<3.1 Operation>

Figure 10:
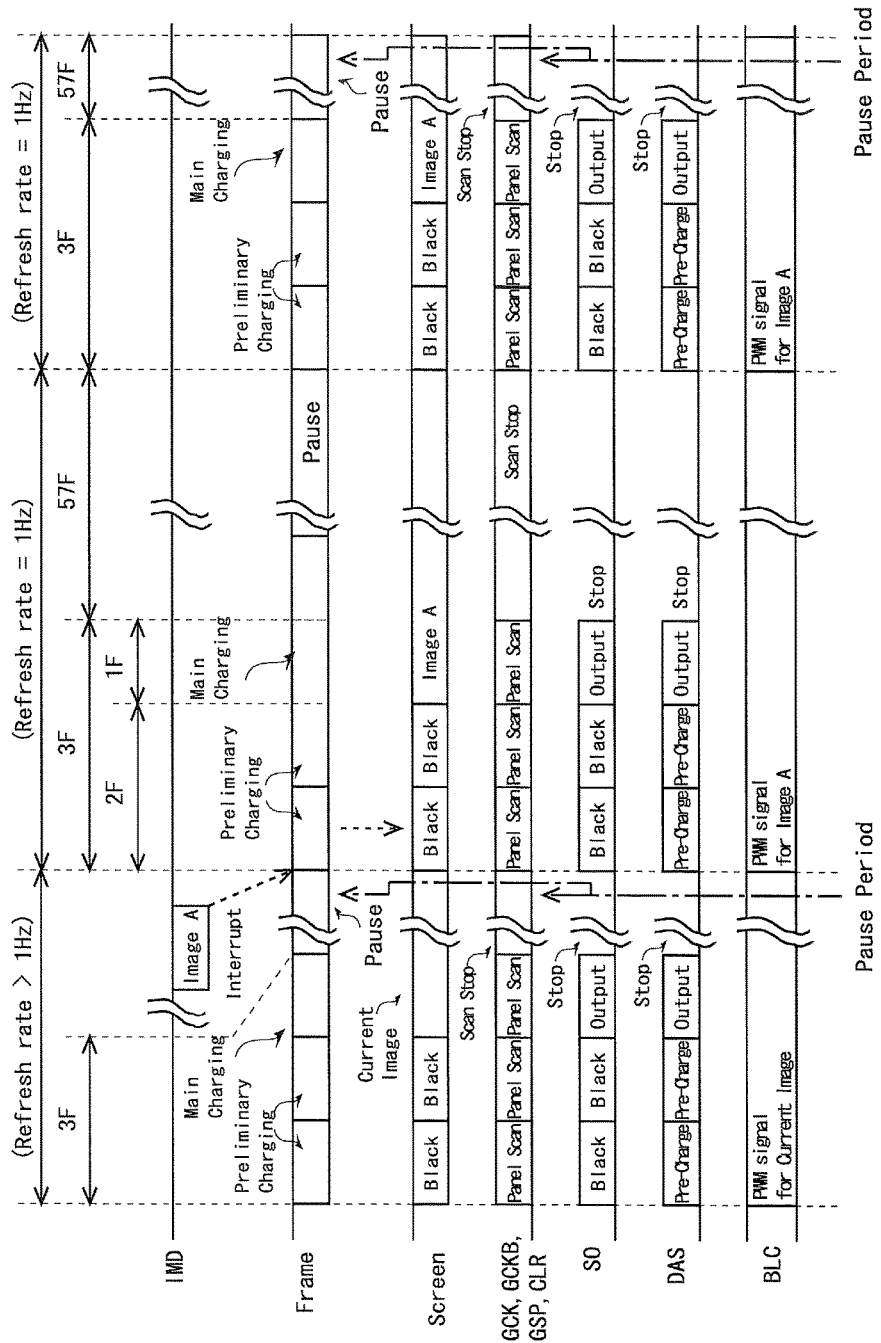
FIG. 10 is a timing chart for describing the operation of a liquid crystal display device according to a third embodiment of the present invention.
Figure 11:
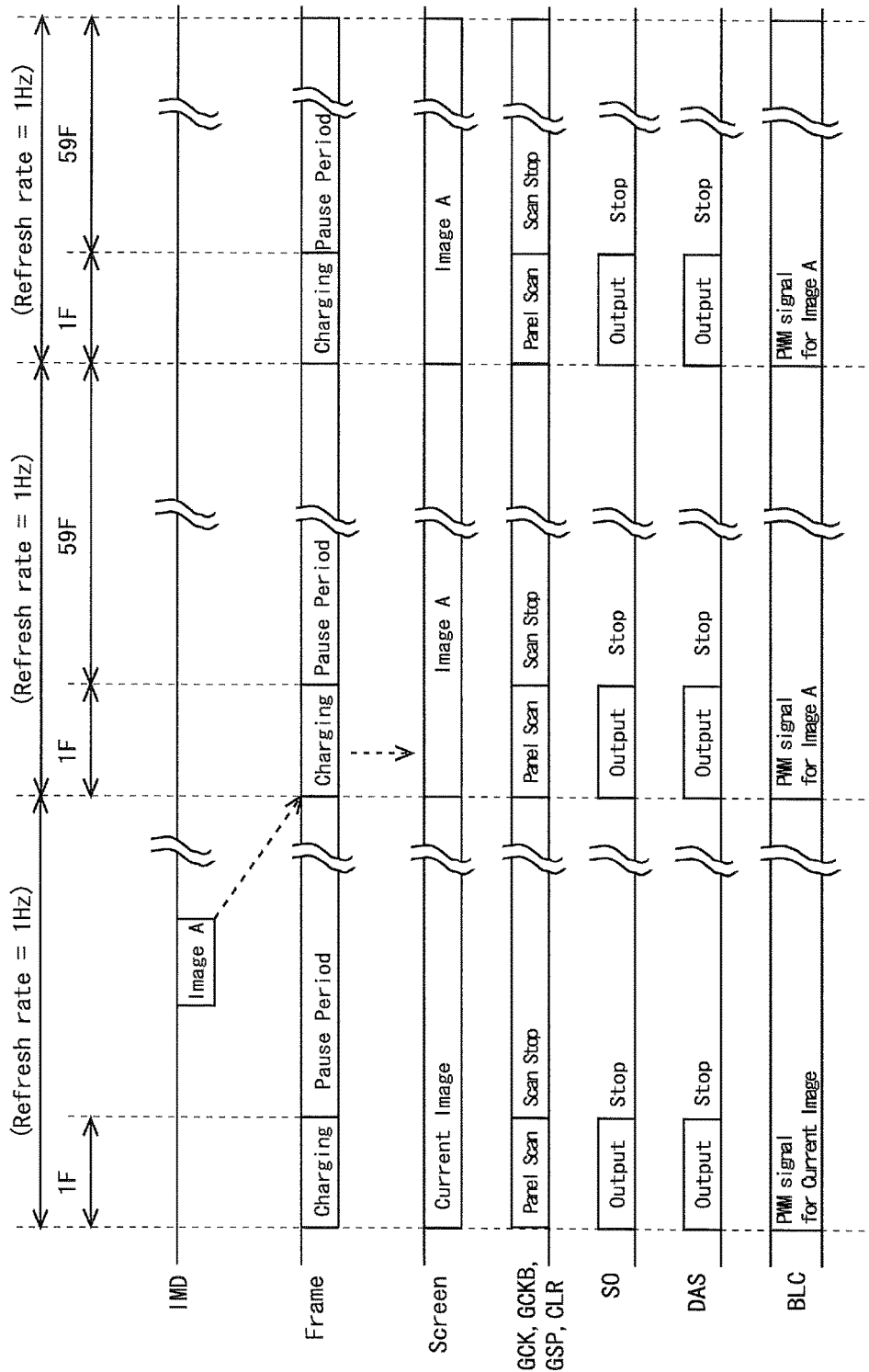
FIG. 11 is a timing chart for describing the operation of a conventional liquid crystal display device that performs low frequency drive.

FIG. 10 is a timing chart for describing the operation of a liquid crystal display device 2 according to the third embodiment of the present invention and a host 1. Since the components of the present embodiment are the same as those of the first embodiment, the same components as those of the first embodiment are denoted by the same reference characters and description thereof is omitted where appropriate. In addition, since the operation of the liquid crystal display device 2 according to the present embodiment is the same as that in the second embodiment, except for operation related to a backlight control signal BLC, common description is omitted where appropriate. As shown in FIG. 10, in the present embodiment, as in the second embodiment, three frames are provided for a charging period, and 57 frames are provided for a pause period for when an interrupt process is not performed. Of the three frames, the first two frames are a preliminary charging period, and the subsequent one frame is a main charging period.

For a charging period transitioned from a pause period without performing an interrupt process, as in the second embodiment, during both of a preliminary charging period and a main charging period, a luminance correction signal (backlight control signal BLC) according to current image data IMD is generated, and corrections of the light emission of a backlight 20 and a source output signal SO according to the luminance correction signal are performed. On the other hand, for a charging period transitioned from a pause period by an interrupt process, unlike the second embodiment, during both of a preliminary charging period and a main charging period, a luminance correction signal according to new image data IMD is generated, and corrections of the light emission of the backlight 20 and a source output signal SO according to the luminance correction signal are performed. Hence, at the point in time when the main charging period starts, corrections of the light emission of the backlight 20 and the source output signal SO by the luminance correction signal according to the new image data IMD have already been performed. Note that a luminance correction signal for a pause period is the same as those of the first and second embodiments, and the same luminance correction signal as that generated during an immediately preceding charging period is continuously generated.

<3.2 Effects>

In the present embodiment, when an interrupt process takes place, a luminance correction signal according to new image data IMD is generated during a preliminary charging period. Hence, at the point in time when a main charging period starts, corrections of the luminance of the light emission of the backlight 20 and a source output signal SO based on the luminance correction signal according to the new image data IMD have already been reflected. By this, display with improved image quality can be immediately obtained during the main charging period included in a charging period transitioned from a pause period by the interrupt process.

<4. Others>

Although in the above-described embodiments the CABC processing unit 32 is provided as an image correcting unit, the present invention is not limited thereto. For example, a processing unit for implementing various image quality correction functions, such as ambient light processing where an image correction is performed according to environmental light, sharpness enhancement where edges are enhanced according to image data IMD, contrast enhancement where contrast is enhanced according to image data IMD, color management where a correction for performing display according to the characteristics of the liquid crystal display panel 10 is performed, and saturation enhancement where saturation is enhanced according to image data IMD, may be provided instead of the CABC processing unit 32 or with the CABC processing unit 32. The operating timing of the processing unit for implementing these image quality correction functions is the same as that of the CABC processing unit 32.

Although in the above-described embodiments description is made using the liquid crystal display device 2 as an example of a display device, the present invention can also be applied to, for example, an organic EL (Electro Luminescence) display device. Note, however, that since an organic EL display device is a self-light emitting type display device that does not require a backlight, the organic EL display device is placed in a non-light emission state during a pause period. In low frequency drive of the organic EL display device, by providing a pause period during which the device is in a non-light emission state, the power consumption required for organic EL light emission can be reduced. Note that in order to avoid a screen from being visually recognized as blinking, for example, when the length of a charging period is one frame, it is desirable that the length of a pause period be about one frame in order to avoid a screen from being visually recognized as blinking. Although in the liquid crystal display devices 2 according to the embodiments, one frame is required for a transition to a charging period from a pause period of the drive state of the liquid crystal display panel 10 by an interrupt process, when the present invention is applied to an organic EL display device, it is desirable that the time required for the transition be shorter than one frame.

Although in the above-described embodiments description is made such that an interface compliant with the DSI standard is used as an interface between the host 1 and the LCD driver IC 30, the present invention is not limited thereto. For example, an interface compliant with the MDDI (Mobile Display Digital Interface) standard, etc., may be used. In addition, the embodiments can be implemented by being varied in many ways without departing from the spirit and scope of the present invention.

By the above, according to the present invention, a drive control device for a display device, a display device including the drive control device, and a drive control method that achieve a reduction in power consumption while reducing screen change time can be provided.

INDUSTRIAL APPLICABILITY

The present invention is applied to a display device capable of achieving a reduction in power consumption while reducing screen change time, when an image is updated in the middle of low frequency drive.

DESCRIPTION OF REFERENCE CHARACTERS

1: HOST
2: LIQUID CRYSTAL DISPLAY DEVICE
10: LIQUID CRYSTAL DISPLAY PANEL
12: TFT (THIN FILM TRANSISTOR)
20: BACKLIGHT
30: LCD DRIVER IC (DRIVE CONTROL DEVICE)
31: DISPLAY CONTROL CIRCUIT
32: CABC PROCESSING UNIT (IMAGE QUALITY CORRECTING UNIT)
33: SOURCE DRIVER (VIDEO SIGNAL LINE DRIVING UNIT)
313: RAM (STORAGE UNIT)
315: LINE MEMORY (STORAGE UNIT)
331: OUTPUT AMPLIFIER
34: POWER SUPPLY CIRCUIT
40: GATE DRIVER (SCANNING SIGNAL LINE DRIVING UNIT)
50: BACKLIGHT DRIVE CIRCUIT
BLC: BACKLIGHT CONTROL SIGNAL
CT: DRIVE CONTROL SIGNAL
DAS: ANALOG SOURCE POWER
DLS: LOGIC SOURCE POWER
DLG: GATE POWER
IMD: IMAGE DATA
SO: SOURCE OUTPUT SIGNAL

The invention claimed is:

1. A drive control device for an organic electro luminescence display device, comprising:
display control circuitry that performs control to refresh a screen of an organic electro luminescence display panel based on image data received from an external source, the organic electro luminescence display panel including: a plurality of scanning signal lines, a plurality of video signal lines, and a plurality of pixel formation portions provided at respective intersections of the plurality of scanning signal lines and the plurality of video signal lines, wherein
the display control circuitry:
includes storage circuitry that stores the image data;
generates a drive control signal that drives the organic electro luminescence display panel such that a light emitting period and a non-light emitting period appear alternately, the non-light emitting period having a predetermined length greater than or equal to the light emitting period; and
performs, when receiving the image data during the non-light emitting period, an interrupt process in which the non-light emitting period is allowed to transition to the light emitting period, within a period shorter than one frame after receiving the image data.

2. The drive control device according to claim 1, wherein the display control circuitry includes an interface that receives the image data from the external source, the interface being compliant with a Display Serial Interface standard.

3. The drive control device according to claim 2, wherein the display control circuitry:
receives the image data in packet units through the interface; and
performs the interrupt process, based on data included in a packet that transmits the image data, the data indicating that writing of the image data into the storage is a first writing.

4. The drive control device according to claim 1, wherein the light emitting period includes a main light emitting period that writes voltages according to the image data into the plurality of pixel formation portions through the plurality of video signal lines.

5. The drive control device according to claim 4, further comprising video signal line driving circuitry that drives the plurality of video signal lines, according to the drive control signal.

6. The drive control device according to claim 5, further comprising a power supply that supplies power that generates an analog signal, to the video signal line driving circuitry, wherein
the power supply:
supplies the power to the video signal line driving circuitry during at least the main light emitting period in the light emitting period; and
stops the supply of the power to the video signal line driving circuitry during the non-light emitting period.

7. The drive control device according to claim 6, wherein
at least the light emitting period transitioned from the non-light emitting period by the interrupt process includes a preliminary light emitting period during which writing of voltages according to the image data into the plurality of pixel formation portions is not performed, the preliminary light emitting period being provided immediately before the main light emitting period, and
the power supply starts supply of the power to the video signal line driving circuitry during the preliminary light emitting period.

8. The drive control device according to claim 7, wherein the video signal line driving circuitry applies a predetermined voltage not related to the image data, during the preliminary light emitting period.

9. The drive control device according to claim 8, further comprising image quality correcting circuitry that performs, during a main light emitting period included in the light emitting period transitioned from the non-light emitting period by the interrupt process, an image quality correction according to the image data received during the non-light emitting period.

10. The drive control device according to claim 9, wherein during a preliminary charging light emitting period included in the light emitting period transitioned from the non-light emitting period by the interrupt process, the image quality correcting circuitry performs in advance an image quality correction according to the image data received during the non-light emitting period.

11. The drive control device according to claim 4, further comprising image quality correcting circuitry that performs, during a main light emitting period included in the light emitting period transitioned from the non-light emitting period by the interrupt process, an image quality correction according to image data received during the non-light emitting period.

12. An organic electro luminescence display device comprising:
the drive control device according to claim 1;
the organic electro luminescence display panel; and
scanning signal line driving circuitry that drives the plurality of scanning signal lines, according to the drive control signal.

13. The organic electro luminescence display device according to claim 12, wherein
each of the plurality of pixel formation portions includes a thin film transistor including: a control terminal connected to one of the plurality of scanning signal lines; a first conduction terminal connected to one of the plurality of video signal lines; a second conduction terminal connected to a pixel electrode to which a voltage according to an image to be displayed is to be applied, the pixel electrode being provided in the organic electro luminescence display panel; and a channel layer made of an oxide semiconductor.

14. A drive control method that performs control to refresh a screen of an organic electro luminescence display panel, based on image data received from an external source, the organic electro luminescence display panel including a plurality of scanning signal lines, a plurality of video signal lines, and a plurality of pixel formation portions provided at respective intersections of the plurality of scanning signal lines and the plurality of video signal lines, the method comprising:
storing the image data in a predetermined storage;
driving the plurality of scanning signal lines such that a light emitting period and a non-light emitting period appear alternately, the non-light emitting period having a predetermined length greater than or equal to the light emitting period; and
an interrupting step of performing, when the image data is received during the non-light emitting period, an interrupt process where the non-light emitting period is allowed to transition to the light emitting period, within a period shorter than one frame after receiving the image data.

15. The drive control method according to claim 14, further comprising receiving the image data from the external source, according to a Display Serial Interface standard.

16. The drive control method according to claim 15, wherein
in the receiving step, the image data is received in packet units, and
in the interrupting step, the interrupt process is performed based on data included in a packet for transmitting the image data, the data indicating that writing of the image data into the storage is a first writing.

* * * * *